(12) United States Patent
Eismann

(10) Patent No.: US 10,604,055 B2
(45) Date of Patent: Mar. 31, 2020

(54) VEHICLE HAVING A DEVICE FOR PROCESSING FOOD

(71) Applicant: Zume, Inc., Mountain View, CA (US)

(72) Inventor: Joachim Eismann, Münster (DE)

(73) Assignee: Zume Pizza, Inc., Mountain View, CA (US)

( * ) Notice: Subject to any disclaimer, the term of this patent is extended or adjusted under 35 U.S.C. 154(b) by 162 days.

(21) Appl. No.: 15/568,120

(22) PCT Filed: Apr. 21, 2016

(86) PCT No.: PCT/EP2016/000648
§ 371 (c)(1),
(2) Date: Oct. 20, 2017

(87) PCT Pub. No.: WO2016/169654
PCT Pub. Date: Oct. 27, 2016

(65) Prior Publication Data
US 2018/0194257 A1    Jul. 12, 2018

(30) Foreign Application Priority Data

Apr. 23, 2015    (DE) .................. 10 2015 005 166

(51) Int. Cl.
*B60N 3/16*       (2006.01)
*B60P 3/025*      (2006.01)
(Continued)

(52) U.S. Cl.
CPC .................. *B60N 3/16* (2013.01); *A21B 1/48* (2013.01); *A21B 1/52* (2013.01); *B60P 3/0257* (2013.01); *B25J 21/02* (2013.01)

(58) Field of Classification Search
CPC .. B60N 3/16; B60N 3/104; A21B 1/48; A21B 1/52; B60P 3/0257; B25J 21/02
(Continued)

(56) References Cited

U.S. PATENT DOCUMENTS 377,594 A  *  2/1888  Baldwin ................ A47B 31/02
                                                    126/268
1,263,804 A  *  4/1918  Rice ....................... A47B 31/02
                                                    126/19.5
(Continued)

FOREIGN PATENT DOCUMENTS

DE       296 06 255 U1    8/1996
EP       2 230 184 A1     9/2010
(Continued)

OTHER PUBLICATIONS

Advisory Action, dated Aug. 27, 2015, for U.S. Appl. No. 13/920,998, Garden, "Systems and Methods of Preparing Food Products," 3 pages.
(Continued)

*Primary Examiner* — Steven B McAllister
*Assistant Examiner* — Daniel E. Namay

(57) ABSTRACT

A motor vehicle (1) having a driver's position (2), having a device (3) adjacent thereto for processing, in particular for assembling, food, and having an oven device (4) for heating foods is designed so that at least the device (3) for processing, in particular assembling, foods is arranged in a section (6) which is separate from the driver's position (2) and which has at least one access option (8) for the driver.

18 Claims, 8 Drawing Sheets

Figure 1:
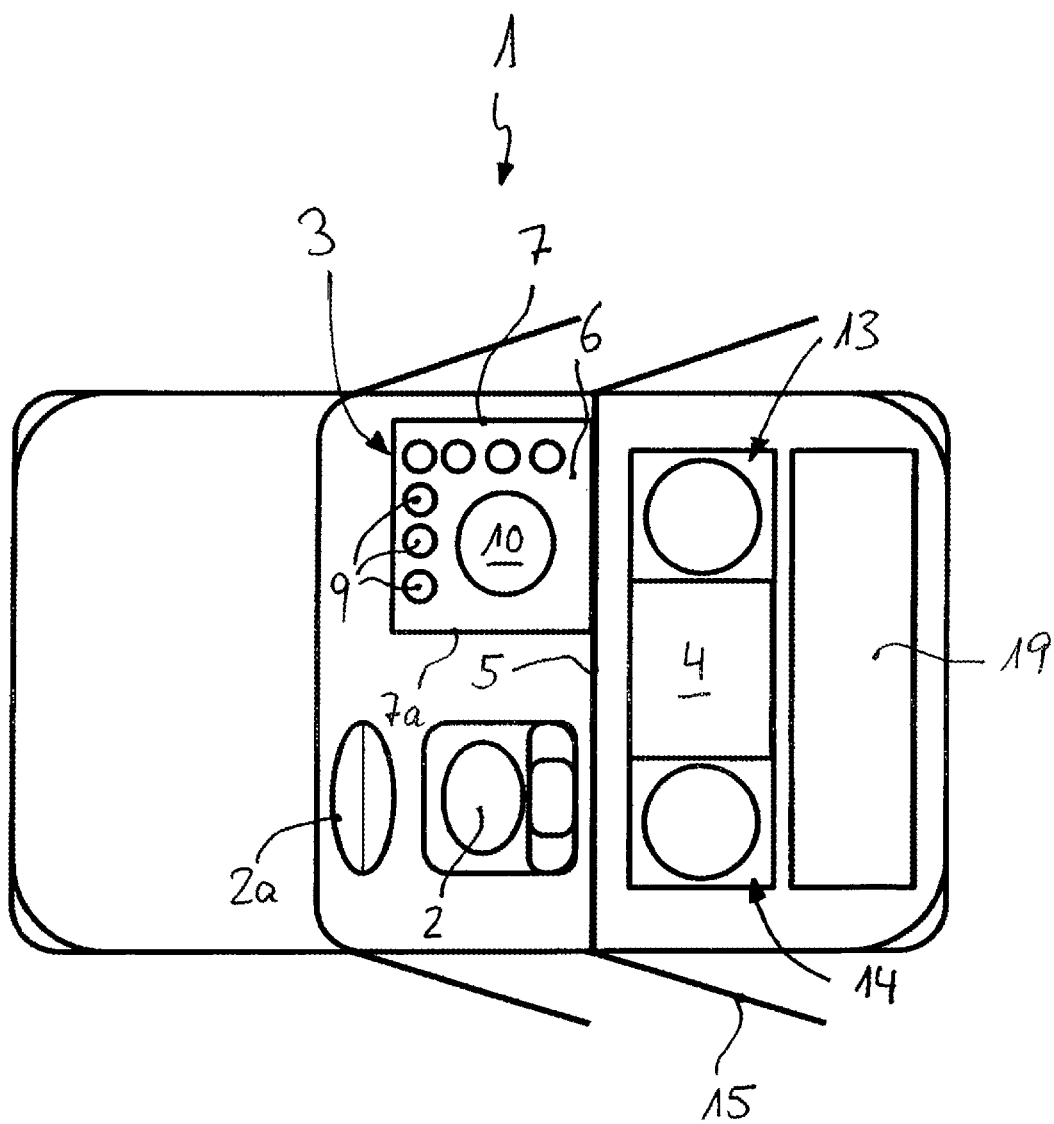

(51) Int. Cl.
  *A21B 1/48* (2006.01)
  *A21B 1/52* (2006.01)
  *B25J 21/02* (2006.01)

(58) Field of Classification Search
  USPC .................................................. 126/276, 268
  IPC ....... B60N 3/16,3/10; A21B 1/52; B60P 3/025
  See application file for complete search history.

(56) References Cited

U.S. PATENT DOCUMENTS

| | | | | |
|---|---|---|---|---|
| 1,263,805 | A | * | 4/1918 | Rice ........................ A47B 31/02 126/19.5 |
| 1,331,241 | A | * | 2/1920 | Converse ................... F24C 5/20 126/268 |
| 3,060,920 | A | * | 10/1962 | Dibert ...................... A47J 37/00 126/25 R |
| 3,191,590 | A | * | 6/1965 | Haley ...................... A47J 37/06 126/19 R |
| 3,521,030 | A | * | 7/1970 | Maahs ....................... B60N 3/16 219/202 |
| 3,985,991 | A | | 10/1976 | Levinson |
| 4,143,902 | A | * | 3/1979 | Johnstone ................ B60N 3/16 292/256.71 |
| 4,373,636 | A | | 2/1983 | Hoffman |
| 4,556,046 | A | | 12/1985 | Riffel et al. |
| 4,632,836 | A | * | 12/1986 | Abbott ...................... A21B 7/00 296/22 |
| 4,656,068 | A | | 4/1987 | Raines |
| 4,716,819 | A | | 1/1988 | Beltz |
| 4,718,769 | A | | 1/1988 | Conkey |
| 4,816,646 | A | | 3/1989 | Solomon et al. |
| 4,912,338 | A | | 3/1990 | Bingham |
| 4,919,477 | A | | 4/1990 | Bingham et al. |
| 4,924,763 | A | | 5/1990 | Bingham |
| 5,031,602 | A | * | 7/1991 | Vick .................... A47J 37/0713 126/1 AA |
| 5,039,535 | A | | 8/1991 | Lang et al. |
| 5,109,760 | A | | 5/1992 | Ansari |
| D326,749 | S | | 6/1992 | Apps et al. |
| 5,243,899 | A | | 9/1993 | Moshier et al. |
| 5,244,344 | A | | 9/1993 | Doeberl et al. |
| 5,256,432 | A | | 10/1993 | McDonald et al. |
| 5,299,557 | A | | 4/1994 | Braithwaite et al. |
| 5,423,477 | A | | 6/1995 | Valdman et al. |
| 5,454,295 | A | | 10/1995 | Cox et al. |
| 5,505,122 | A | * | 4/1996 | Gerrit .................... A47J 39/003 126/19.5 |
| 5,732,610 | A | | 3/1998 | Halladay et al. |
| 5,921,163 | A | | 7/1999 | McInnes et al. |
| 5,921,170 | A | | 7/1999 | Khatchadourian et al. |
| 5,997,924 | A | | 12/1999 | Olander, Jr. et al. |
| D426,646 | S | | 6/2000 | Monaghan et al. |
| 6,189,944 | B1 | * | 2/2001 | Piche .................... B60P 3/0257 296/22 |
| 6,320,165 | B1 | | 11/2001 | Ovadia |
| 6,396,031 | B1 | | 5/2002 | Forrester |
| 6,431,628 | B1 | * | 8/2002 | Bell, Jr. ................ B60P 3/0257 296/22 |
| 6,465,244 | B1 | * | 10/2002 | Annable .................. B01L 1/025 119/311 |
| 6,513,671 | B2 | | 2/2003 | Dicello et al. |
| 6,568,586 | B1 | | 5/2003 | VanEsley et al. |
| 6,626,996 | B1 | | 9/2003 | Amigh et al. |
| 6,755,122 | B2 | | 6/2004 | Holmes |
| 6,843,167 | B1 | | 1/2005 | Kanafani et al. |
| 6,858,243 | B2 | | 2/2005 | Blanchet et al. |
| 6,957,111 | B2 | | 10/2005 | Zhu et al. |
| 7,127,984 | B2 | | 10/2006 | Holmes |
| 7,174,830 | B1 | | 2/2007 | Dong |
| 7,263,990 | B1 | * | 9/2007 | Lenhart ...................... F24C 3/14 126/268 |
| 7,505,929 | B2 | | 3/2009 | Angert et al. |
| 7,678,036 | B1 | | 3/2010 | Malitas et al. |
| 7,778,773 | B2 | | 8/2010 | Yaqub et al. |
| 7,884,306 | B2 | | 2/2011 | Leach |
| 7,984,667 | B2 | | 7/2011 | Freudinger |
| 8,549,432 | B2 | | 1/2013 | Warner |
| 8,430,262 | B2 | | 4/2013 | Corbett et al. |
| 8,561,823 | B1 | | 10/2013 | Krupa |
| 8,663,419 | B2 | | 3/2014 | Corbett et al. |
| 8,807,377 | B2 | | 8/2014 | Corbett et al. |
| D720,227 | S | | 12/2014 | Corbett et al. |
| 8,991,635 | B2 | | 3/2015 | Myerscough |
| 9,010,621 | B2 | | 4/2015 | Baker et al. |
| 9,126,717 | B2 | | 9/2015 | Myerscough |
| 9,126,719 | B2 | | 9/2015 | Corbett et al. |
| D743,302 | S | | 11/2015 | Weiner et al. |
| D743,311 | S | | 11/2015 | Weiner et al. |
| 9,292,889 | B2 | | 3/2016 | Garden |
| D754,250 | S | | 4/2016 | Elmer |
| 9,321,387 | B2 | * | 4/2016 | Lamb ................... B67D 1/0889 |
| 9,387,786 | B2 | | 7/2016 | Weiner et al. |
| 9,446,889 | B2 | | 9/2016 | Lopes et al. |
| D774,900 | S | | 12/2016 | Longoni et al. |
| 9,522,761 | B2 | | 12/2016 | Baker et al. |
| 9,788,157 | B2 | | 10/2017 | Shaffer et al. |
| 9,815,191 | B2 | | 11/2017 | Oleynik |
| 9,914,223 | B2 | | 3/2018 | Fritz-Jung et al. |
| 10,140,587 | B2 | | 11/2018 | Garden |
| 2002/0153370 | A1 | * | 10/2002 | Stutman ................... B60N 3/16 219/715 |
| 2003/0209194 | A1 | | 11/2003 | Amigh et al. |
| 2004/0026946 | A1 | * | 2/2004 | Reed, III .............. B60P 3/0257 296/24.3 |
| 2004/0253348 | A1 | | 12/2004 | Woodward et al. |
| 2005/0193901 | A1 | | 9/2005 | Buehler |
| 2006/0027106 | A1 | | 2/2006 | Craig et al. |
| 2006/0049198 | A1 | * | 3/2006 | Guard .................. B60P 3/0257 221/24 |
| 2006/0226669 | A1 | | 10/2006 | Tong et al. |
| 2007/0160715 | A1 | | 7/2007 | Elnakib et al. |
| 2008/0023459 | A1 | | 1/2008 | Leach |
| 2009/0048890 | A1 | | 2/2009 | Burgh |
| 2009/0057381 | A1 | | 3/2009 | Gokhale |
| 2011/0235463 | A1 | | 9/2011 | Justusson et al. |
| 2012/0019110 | A1 | * | 1/2012 | Ono ........................ B25J 21/02 312/1 |
| 2012/0024897 | A1 | | 2/2012 | Corbett et al. |
| 2013/0101709 | A1 | | 4/2013 | Rader |
| 2014/0196411 | A1 | * | 7/2014 | Procyshyn ............... B25J 21/02 53/467 |
| 2014/0239020 | A1 | * | 8/2014 | Lamb .................. B67D 1/0889 222/610 |
| 2014/0370167 | A1 | * | 12/2014 | Garden .................. G06Q 50/12 426/233 |
| 2015/0019354 | A1 | | 1/2015 | Chan et al. |
| 2015/0343936 | A1 | | 12/2015 | Weiner et al. |
| 2016/0054163 | A1 | | 2/2016 | Walton et al. |
| 2016/0162833 | A1 | | 6/2016 | Garden |
| 2016/0260161 | A1 | | 9/2016 | Atchley et al. |
| 2016/0264033 | A1 | * | 9/2016 | Tollefson ................ A23G 9/288 |
| 2017/0010608 | A1 | | 1/2017 | High et al. |
| 2017/0024806 | A1 | | 1/2017 | High et al. |
| 2017/0055752 | A1 | | 3/2017 | Mueller et al. |
| 2017/0124670 | A1 | | 5/2017 | Becker et al. |
| 2017/0148075 | A1 | | 5/2017 | High et al. |
| 2017/0178066 | A1 | | 6/2017 | High et al. |
| 2017/0290545 | A1 | | 10/2017 | Garden et al. |
| 2017/0345033 | A1 | | 11/2017 | Wilkinson et al. |
| 2018/0025445 | A1 | | 1/2018 | Becker et al. |
| 2018/0053369 | A1 | | 2/2018 | High et al. |
| 2018/0060943 | A1 | | 3/2018 | Mattingly et al. |
| 2018/0071939 | A1 | | 3/2018 | Garden et al. |
| 2018/0105344 | A1 | | 4/2018 | Chiang et al. |
| 2018/0121037 | A1 | | 5/2018 | Wajda et al. |
| 2019/0047457 | A1 | | 2/2019 | Eismann |

FOREIGN PATENT DOCUMENTS

| | | |
|---|---|---|
| EP | 1 685 045 B2 | 12/2014 |
| FR | 3 027 148 A1 | 4/2016 |

(56) References Cited

FOREIGN PATENT DOCUMENTS

| FR | 3 047 146 A1 | 8/2017 |
|---|---|---|
| FR | 3 047 149 A1 | 8/2017 |
| FR | 3 047 150 A1 | 8/2017 |
| FR | 3 047 158 A1 | 8/2017 |
| JP | 2002-347944 A | 12/2002 |
| JP | 5244344 B2 | 7/2013 |
| KR | 20-0360448 Y1 | 8/2004 |
| KR | 10-2009-0098949 A | 9/2009 |
| KR | 20150121771 A | 10/2015 |
| WO | 92/08358 A1 | 5/1992 |
| WO | 01/67869 A1 | 9/2001 |
| WO | 2012/005683 A1 | 1/2012 |
| WO | 2015006649 A1 | 1/2015 |
| WO | 2016/169654 A1 | 10/2016 |
| WO | 2017/019501 A1 | 2/2017 |
| WO | 2017/134147 A1 | 8/2017 |
| WO | 2017/134149 A1 | 8/2017 |
| WO | 2017/134150 A1 | 8/2017 |
| WO | 2017/134153 A1 | 8/2017 |
| WO | 2017/134156 A1 | 8/2017 |
| WO | 2017/205758 A1 | 11/2017 |
| WO | 2018/039549 A1 | 3/2018 |
| WO | 2018/052583 A1 | 3/2018 |
| WO | 2019014023 A1 | 1/2019 |

OTHER PUBLICATIONS

Advisory Action, dated Jul. 29, 2015, for U.S. Appl. No. 13/920,998, Garden, "Systems and Methods of Preparing Food Products," 3 pages.
Becker et al., "A System and Process for Managing Preparation and Packaging of Food and/or Beverage Products for a Precise Delivery Time," U.S. Appl. No. 15/217,314, filed Jul. 22, 2016, 75 pages.
Extended European Search Report, dated Jun. 22, 2016, for corresponding EP Application No. 14814044.5, 8 pages.
Garden, "Systems and Methods of Preparing Food Products," Amendment, filed Apr. 2, 2015, for U.S. Appl. No. 13/920,998, 23 pages.
Garden, "Systems and Methods of Preparing Food Products," Response Under 37 CFR 1.116, filed Aug. 10, 2015, for U.S. Appl. No. 13/920,998, 29 pages.
Garden, "Systems and Methods of Preparing Food Products," Response Under 37 CFR 1.116, filed Jul. 22, 2015, for U.S. Appl. No. 13/920,998, 29 pages.
Garden, "Systems and Methods of Preparing Food Products," Submission for RCE Pursuant to 37 CFR 1.114, filed Sep. 25, 2015, for U.S. Appl. No. 13/920,998, 29 pages.
Garden, "Systems and Methods of Preparing Food Products," U.S. Appl. No. 15/040,866, filed Feb. 10, 2016, 71 pages.
Gardner, "Systems and Methods of Preparing Food Products," Response to Restriction Requirement, filed Oct. 24, 2014, for U.S. Appl. No. 13/920,998, 3 pages.
International Search Report, dated Oct. 22, 2014, for International Application No. PCT/US2014/042879, 3 pages.
International Search Report, dated Sep. 5, 2016, for International Application No. PCT/EP2016/00648, 3 pages (English translation).
International Search Report and Written Opinion of the International Searching Authority, dated Nov. 27, 2017, for International Application No. PCT/US2017/026408, 36 pages.
International Search Report and Written Opinion of the International Searching Authority, dated Jan. 31, 2018, for International Application No. PCT/US2017/050950, 20 pages.
Lamb, "Scoop: Little Caesars Has a Patent for a Pizza-Making Robot," downloaded from https://thespoon.tech/scoop-little-caesars-has-a-patent-for-a-pizza-making-robot/ on Mar. 14, 2018, 3 pages.
Notice of Allowance, dated Jan. 7, 2016, for U.S. Appl. No. 13/920,998, Garden, "Systems and Methods of Preparing Food Products," 9 pages.
Nourish Technology, "Teaching robots how to cook," downloaded from https://angel.co/nourish-technology, on Jul. 12, 2017, 6 pages.
Office Action, dated Mar. 16, 2015, for U.S. Appl. No. 13/920,998, Garden, "Systems and Methods of Preparing Food Products," 28 pages.
Office Action, dated May 27, 2015, for U.S. Appl. No. 13/920,998, Garden, "Systems and Methods of Preparing Food Products," 31 pages.
Restriction Requirement, dated Sep. 10, 2014, for U.S. Appl. No. 13/920,998, Gardner, "Systems and Methods of Preparing Food Products," 5 pages.
Veebie, "Delicious Food. Zero Wait," downloaded from http://www.veebie.me/ on Oct. 20, 2017, 8 pages.
Written Opinion of the International Searching Authority, dated Oct. 22, 2014, for International Application No. PCT/US2014/042879, 8 pages.
Written Opinion of the International Searching Authority, dated Sep. 5, 2016, for International Application No. PCT/EP2016/00648, 12 pages (with English translation).
Advisory Action, dated Apr. 6, 2018, for U.S. Appl. No. 15/040,866, Garden, "Systems and Methods of Preparing Food Products," 4 pages.
CPG Insights, "Mobile factories and robotic pizza chefs : Rev your engines," email newsletter, mailed May 10, 2018, 13 pages.
Garden, "Methods of Preparing Food Products," Response Under 37 CFR 1.116, filed Mar. 23, 2018, for U.S. Appl. No. 15/040,866, 14 pages.
Pershan, "Grocery Delivery Startup Tests A.I. To Outsmart Food Waste (and Amazon)" downloaded from https://sf.eater.com/2018/3/19/16427328/farmstead-sf-grocery-delivery-startup-amazon on Mar. 26, 2018, 3 pages.
EKIM, "Robots at the Service of taste : EKIM launches the restoration of the future with the first robot cook!" downloaded from https://ekim.fr/ on Jun. 29, 2018, 11 pages.
Joussellin, "Pizza: the pizza-machine robots go to the stove," published online Jun. 3, 2018, downloaded from http://www.rtl.fr/actu/futur/pizza-les-robots-pizzaiolos-se-mettent-au-fourneau-7793604225 on Jun. 7, 2018, 8 pages (with machine generated English translation).
Ohr, "French food tech startup EKIM raises €2.2 million to start the food "robolution"," published online May 22, 2018, downloaded from http://www.eu-startups.com/2018/05/french-food-tech-startup-ekim-raises-e2-2-million-to-start-the-food-robolution/ on Jun. 7, 2018, 2 pages.
Shaw, "Robot Investments Weekly: Pizza Robots, Picking Platform Get Pieces of Funding Pie," published online May 25, 2018, downloaded from https://www.roboticsbusinessreview.com/financial/robot-investments-weekly-pizza-robots-earn-slice-of-funding-pie/?utm_source=newsletter&utm_medium=email&utm_campaign=weekly_roundup&eid=399365852&bid=2127951 on Jun. 7, 2018, 4 pages.
International Search Report and Written Opinion for PCT/US2018/040730 dated Nov. 14, 2018 in 22 pages.
International Search Report, dated Sep. 5, 2016, for International Application No. PCT/EP2016/000648, 3 pages (English translation).

* cited by examiner

VEHICLE HAVING A DEVICE FOR PROCESSING FOOD

The invention relates to a motor vehicle having a driver's position, having a device adjacent thereto for processing, in particular assembling, foods, and having an oven device for heating foods.

U.S. Pat. No. 4,919,477 A shows a pick-up vehicle in which a preparation of pizzas is possible in that, instead of the passenger seat, a preparation station is arranged on which a pizza tray can be placed and then transported through a window into an oven in the bed of the pick-up. However, because the driver customarily has physical contact with vehicle parts, customers and money and the preparation station is exposed to the full amount of dust in the vehicle, such a solution is unsatisfactory for hygienic reasons.

DE 17 82 563 U shows a motor vehicle having a driver's position and having a device positioned therebehind for processing foods, namely a closed kitchen section. This kitchen section is separated from the driver's position by a fireproof (and thus continuous) wall. There is no possibility of access from the driver's position into the kitchen section. The kitchen section must instead be entered by a separate side door. Processing from the driver's position is thus completely impossible. At the appropriate time, a parking place must always be selected that permits this switchover by the driver, something that is almost impossible in big-city traffic. A second person is therefore required in the vehicle, which significantly impacts the balance sheet.

The invention is based on creating an improvement of a preparation and delivery vehicle.

The invention solves this problem by a motor vehicle having certain features, as well as by a motor vehicle having other features. With respect to advantageous embodiments, reference is made to certain dependent claims.

Through the invention in a design, a combined preparation and delivery vehicle is created having a device adjacent to the driver's position for processing foods and having an oven device for heating foods, wherein since at least the device for processing, in particular for assembling, foods is arranged in a section separated from the driver, at least a dust protection for the preparation of the food is achieved. However, the driver can carry out the preparation via the access opening(s). The access opening(s) are accessible from the driver's position so that handling is very easy.

Advantageously, there are no fabric surfaces in the section so that cleaning is simple, and dirt has little opportunity for adhesion.

In particular if the preparation by the driver is possible without direct contact with the food, the hygienic conditions are significantly improved. The driver's hands, which are difficult to disinfect in the vehicle, need not touch the raw foods that are generally present in a cold, fresh condition.

If the section is separated from the driver's position by an at least partially transparent partition wall, visual monitoring can take place during the processing. In particular, the wall here is largely transparent, so that a storage having ingredients as well as a surface such as for rolling and applying dough, as appropriate, are clearly visible.

Especially advantageous hygienically, it is possible to reach through the partition wall using gloves. To do this, at least one sealed working glove that is built in and extends into the section can be provided. Manual work is thus possible without direct hand contact with the foods. The glove(s) is or are effective as a hygienic, protective barrier and prevent transmission of germs to the foods. Precise manual work, for example even the application of different ingredients to a pizza dough or other dough blank according to an individual order, is easily possible. In particular, such gloves are oversized, especially in the arm region, so that easy and fast access is possible.

Additionally or alternatively, the section can be provided with at least one robotics unit for processing foods controlled from the outside, for example, such that ingredients that can be selected by the driver are automatically collected from an ingredient storage container and applied to the pizza dough. Appropriate, rolled-out blanks can be kept for such a pizza dough. Alternatively, it can also be rolled out in the automobile, for example via access using two working gloves.

If the section forms a closed, modular unit, it can be easily exchanged as a whole. Installation in the vehicle can also take place easily and by connecting to existing attachments. Thus the passenger's seat, for example, can be removed and the section then secured to the remaining seat rails.

An advantageous embodiment provides that the section has its own ventilation device. In this manner, direct air exchange between the driver and the foods can be prevented so that, in this respect too, transmission of pathogens is reliably prevented. Additionally, a cooling device for the section can also be easily integrated into a separate ventilation device, significantly prolonging the freshness of the ingredients and also hindering the growth of pathogens. Because of the separation of the section, the driver can set a comfortable temperature for himself. Instead of a complete cooling of the section, it is also possible for it to be cooled only in zones or to include a spatially separated cooling device for storage of foods, which can then also be opened robotically or by the driver with the working gloves.

Depending upon the design of the section, it can also include the oven device. Alternatively, this is located in an additional closed section, wherein the two sections can be connected to each other via an opening.

In any case, processing of foods by loading a pizza blank and/or a noodle or other dough base with different ingredients stored in the section by the driver himself is also possible, where appropriate, indirectly via the robotics unit, wherein also the transfer in particular of the blanks thus assembled to the oven device, and even the insertion of the finished product into a package can be accomplished by the driver and from the driver's position. Thus, on the whole, a cost-saving, one-man-operation is possible for the processing as well as for the heating, packaging and delivery of the prepared products. Additionally, the driver can also carry out the order processing and thus operate a fully autonomous delivery service, for example for pizza, noodles, salads, hamburgers and the like, without needing a stationary kitchen or management.

If, advantageously, the oven device is arranged in a section located behind the driver's position and separated from the driver's position by a thermally insulating wall, heat conduction to the driver's position is minimal. This can be air-conditioned as in any conventional vehicle.

It is also possible to use vehicles of a standard, compact design without having to resort to large pick-up vehicles, delivery trucks or the like. With delivery trucks, in particular, recourse to compact vehicles is very advantageous in large cities because of the difficult parking conditions.

For high efficiency and good hygiene, the oven device can include a conveyor oven oriented in the vehicle-transverse direction in an embodiment. The loading side can then be located in the separate section under almost "clean-room conditions," while the insusceptible removal side of the heated products is located at a rear side door or tailgate, and removal from outside is easily possible there.

It is also alternatively possible here that the oven device includes a plurality of separate oven compartments next to each other and/or one above the other. In this case, a plurality of dishes, for example pizza, can be prepared in a manner overlapping in time.

The foods heated in the oven device can be removed from outside through a separate vehicle door. Separate flaps or other variations from a standard vehicle are not necessary.

For rounding out the range of products, an additional cooling device, for example for drinks, and/or ice cream, desserts, replacement ingredients or the like can be arranged in the vehicle.

Using the modular arrangement, installation in a customary subcompact is also possible. Only some of the seats need to be removed. The complete device built from modules can be slid into the automobile and adapted in position. The modules need not be separable from each other to accomplish this. The complete device can also be removed from the automobile for cleaning purposes.

Additional advantages and features of the invention derive from the following exemplary embodiments of the subject matter of the invention described in the drawing.

Figure 2:
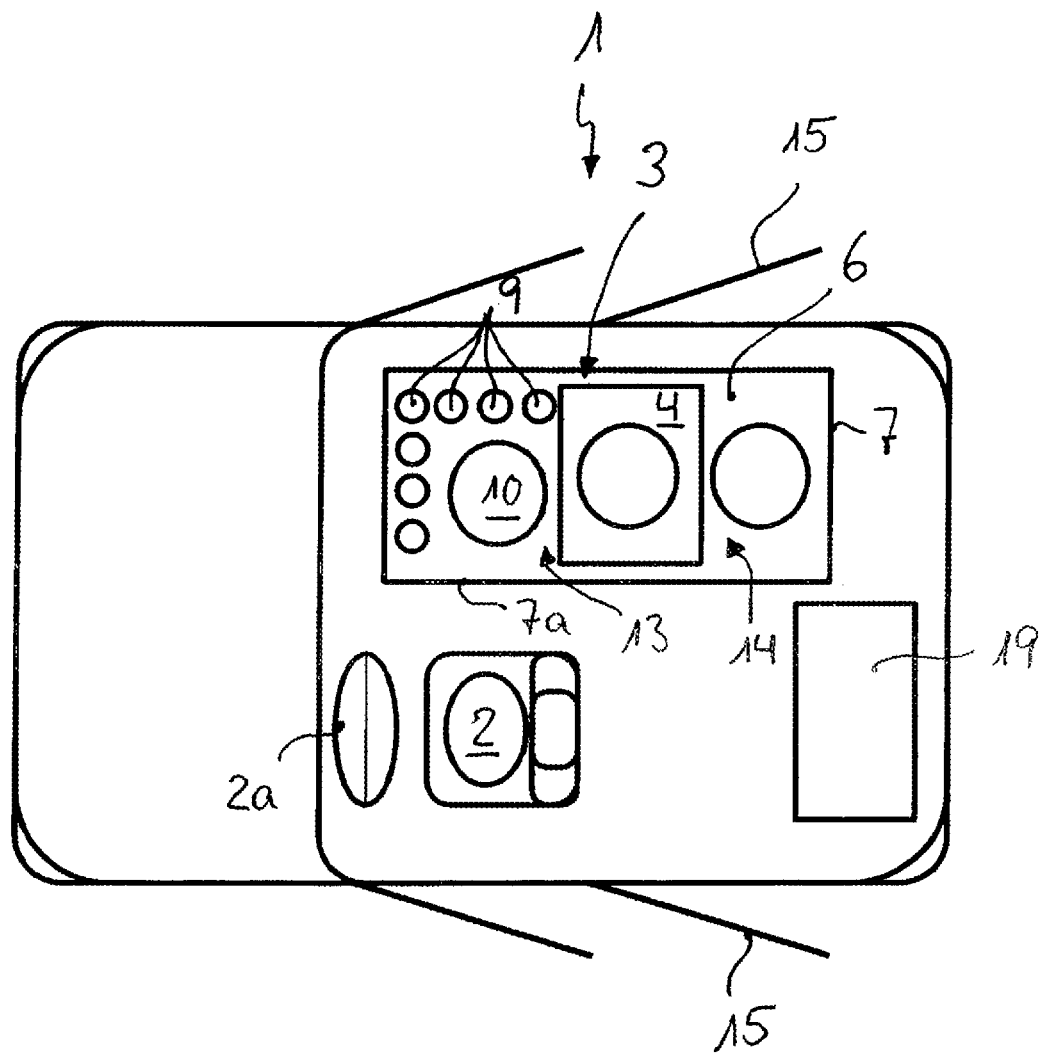
Figure 3:
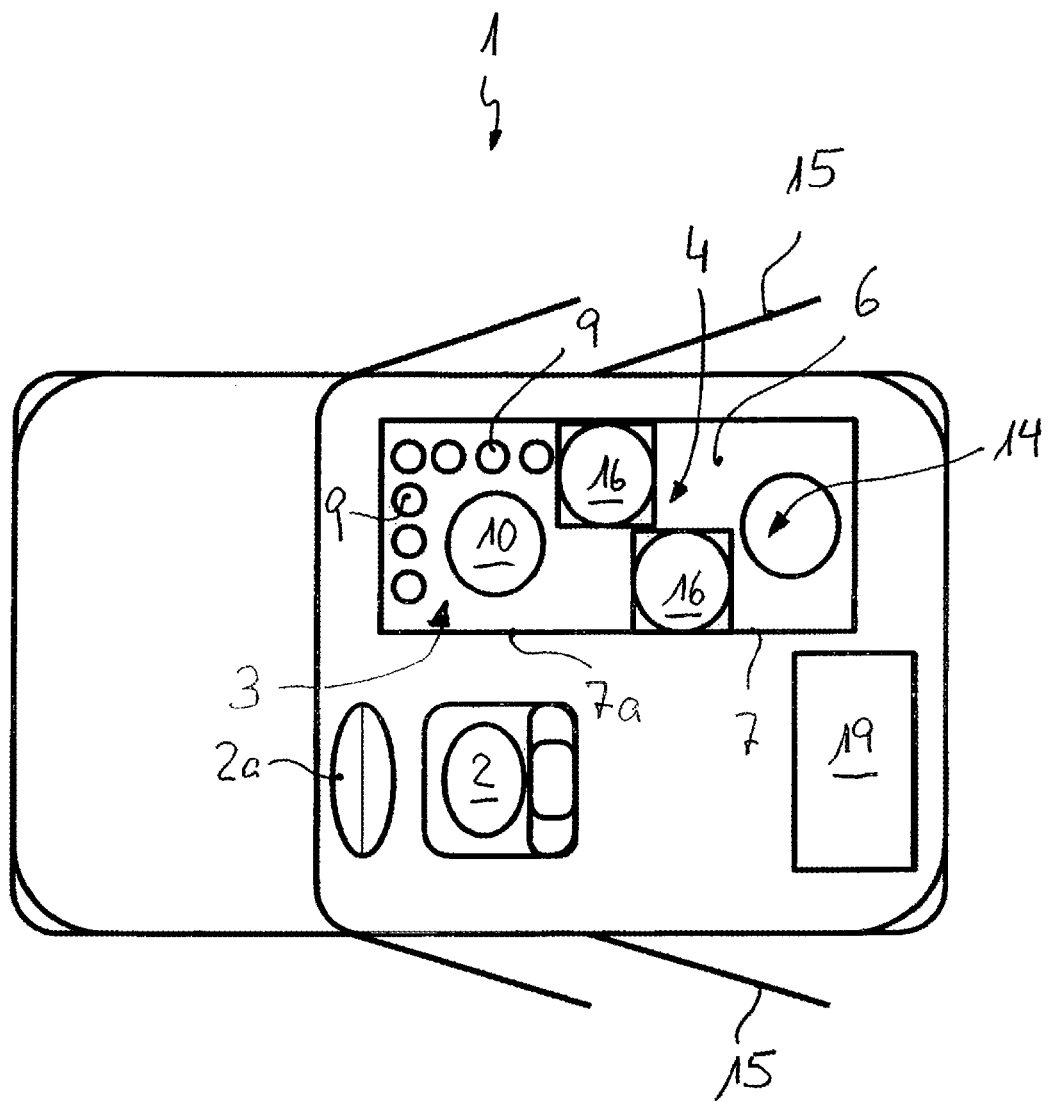
Figure 4:
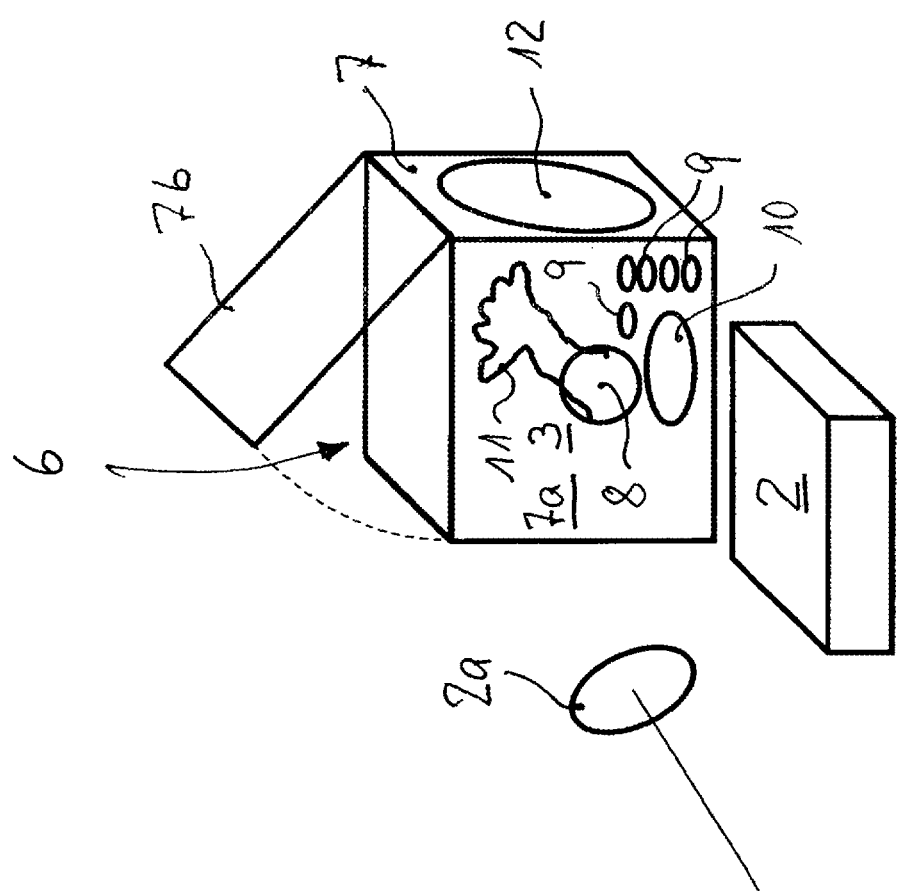
Figure 5:
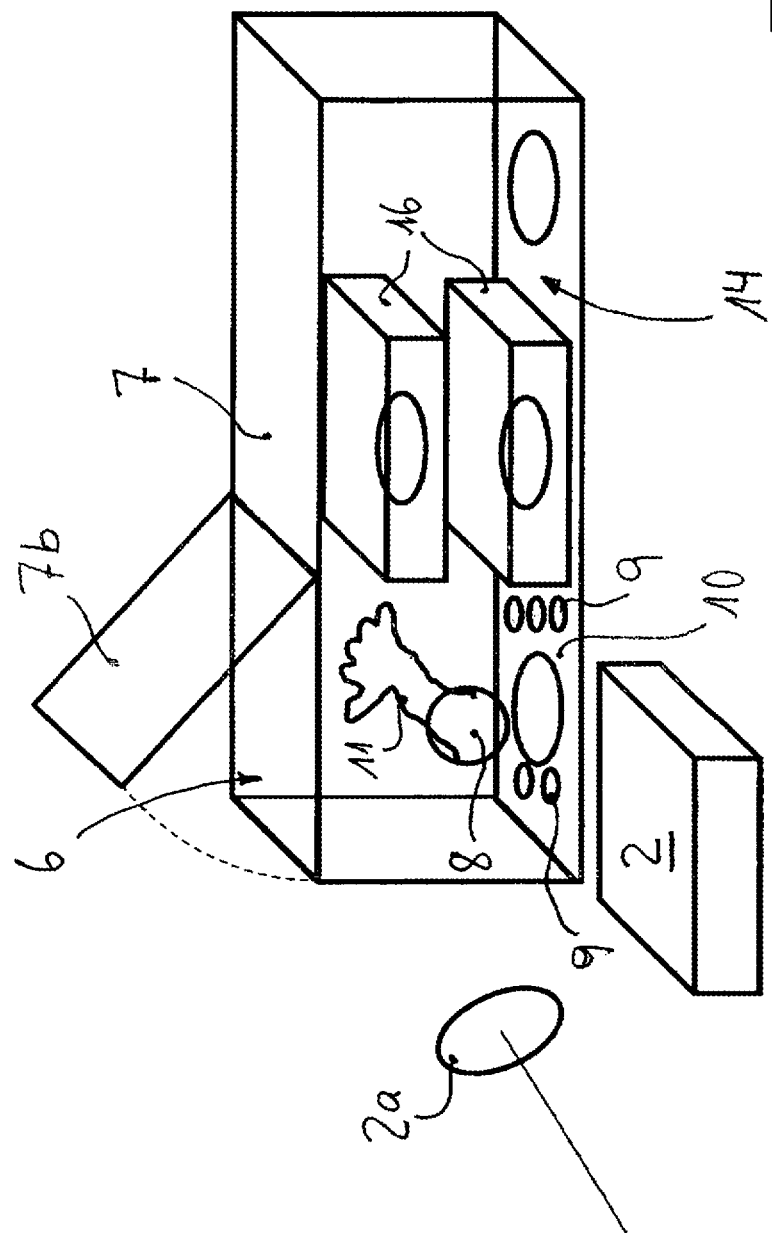
Figure 6:
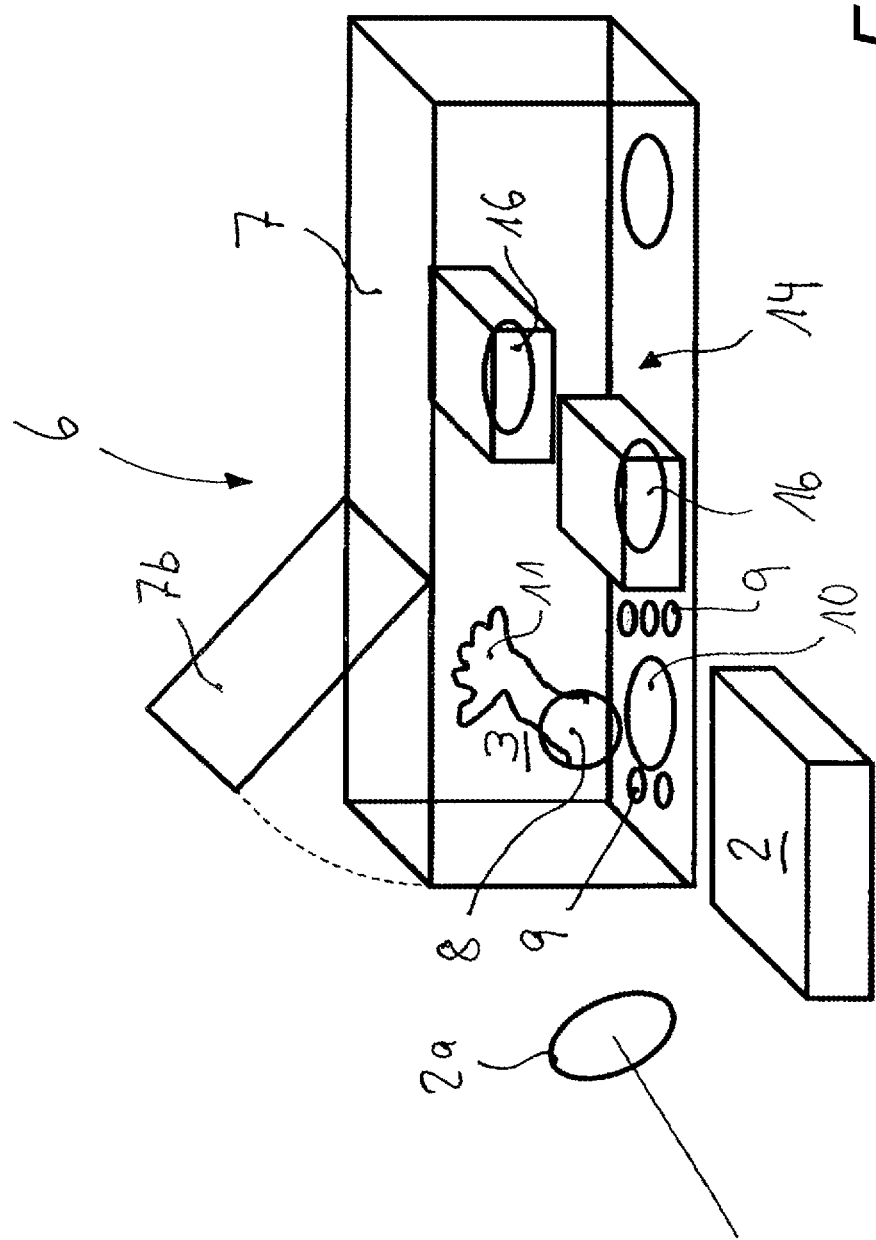
Figure 7:
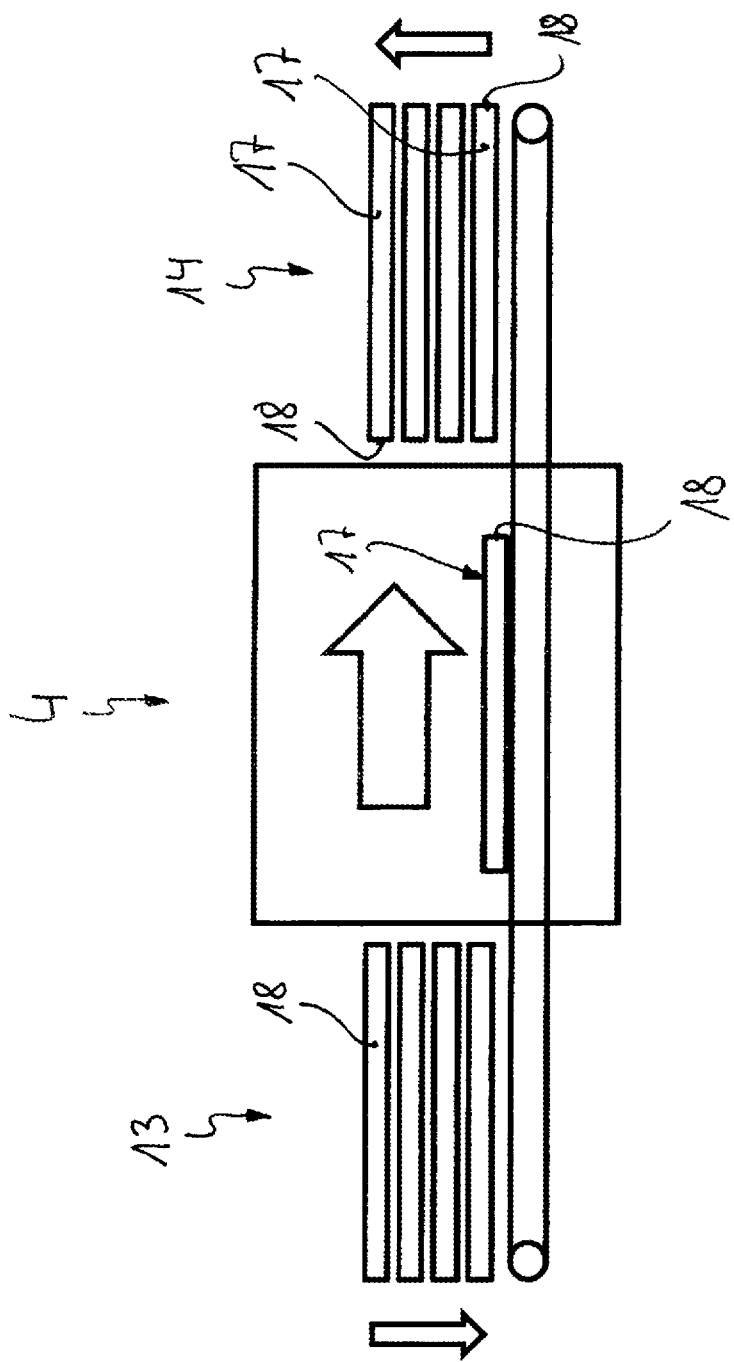
Figure 8:
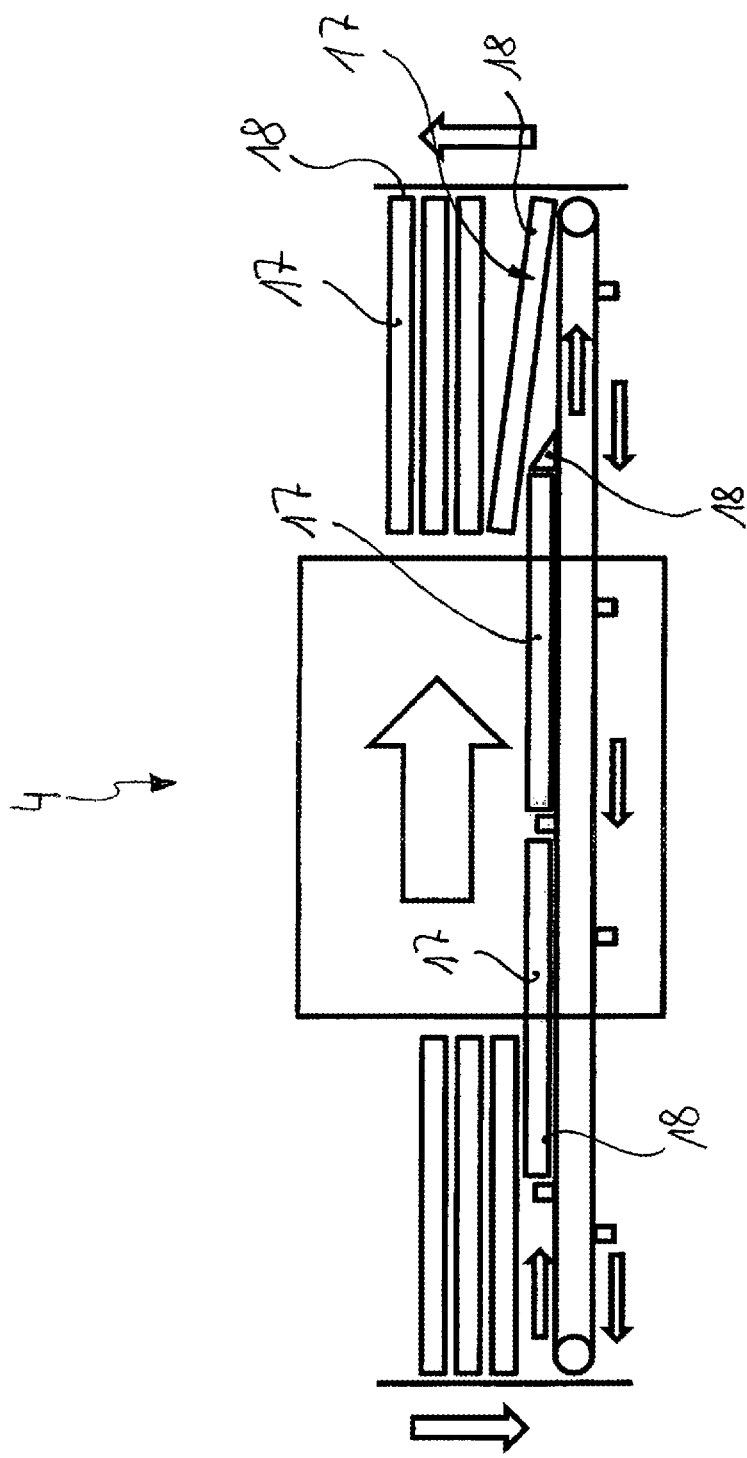

The drawing shows:

FIG. 1 a first vehicle in a schematic top view, in which a section is arranged next to the driver's position, and a partition wall is provided to a rearwards region having a transversely arranged conveyor oven, FIG. 2 an alternative vehicle in which a section is arranged continuously towards the back next to the driver's position, which includes an oven device, FIG. 3 a view similar to FIG. 2, but having a plurality of oven compartments offset obliquely to one another, FIG. 4 a schematic perspective view of the situation in the front part of the vehicle according to FIG. 1, FIG. 5 a view similar to FIG. 4, but of the section in the vehicle according to FIG. 2, wherein, for example, two oven sections are provided one above the other, FIG. 6 a view similar to FIG. 5, but having two oven compartments offset obliquely to each other—as in FIG. 3, FIG. 7 a view of a conveyor oven, in this case having a loading side to the left and a removal side to the right, FIG. 8 a view similar to FIG. 7 during the oven feeding mode.

The vehicle indicated overall as 1 in FIG. 1 is a self-propelled motor vehicle, which includes a driver's position 2 located behind a steering wheel 2a and a device 3, here adjacent thereto, for processing, in particular for assembling, foods. In addition, vehicle 1 is provided with an oven device 4 for heating foods that in this case is arranged in the rear vehicle region behind a partition wall 5 thermally insulated with respect to driver's position 2.

Adjacent in this case does not necessarily mean that device 3 is positioned in a transverse direction next to the driver's position, rather, it could also, in the case of a rotatable driver's position 2, be located (obliquely) behind it.

Device 3 for processing, in particular for assembling, foods is arranged separated from the driver in a section 6, whose walls can form a prefabricated, modular box 7, wherein at least one access option 8 is provided for the driver in a partition wall 7a at driver's position 2.

At least this partition wall 7a can in some areas be formed as transparent, for example over the whole height of the partition wall toward the driver. For example, the section can also be looked into obliquely from above. The remaining walls can be transparent and be made of Plexiglas or the like. This is not mandatory.

A plurality of preparation sections 9 for ingredients is arranged in the section, for example, above and/or next to one another, and a processing surface 10 for rolling and/or coating a dough blank, for example, can be provided. Box 7 can be opened for refilling and cleaning purposes, for example via a swiveling flap 7b.

It is particularly advantageous if, as shown here, section 6 is provided with means that enable processing by the driver without his direct contact with the foods. To do this, reaching through partition wall 7a is possible using gloves, for example. In particular, partition wall 7a is provided with at least one working glove 11 installed in a sealed manner and extending into section 6. Two working gloves 11 of this type are obviously possible for two-armed access. With this, a fully air-tight closure of section 6 to driver's position 2 is possible. Section 6 can thus be built as a completely closed unit.

Section 6 can also have its own ventilation device, having filters as necessary, in order to achieve a hygienic optimization. Section 6 can thus also be partially or fully coolable. Of course, one or a plurality of separate refrigerators can also be provided that can be contained within section 6 so that the foods removed from it are only transported in protected section 6.

Additionally or alternatively to the manual access, section 6 can be provided with at least one robotics unit controllable from the outside for processing foods. Thus, for example, it can be decided from outside which ingredients should go on a pizza, the robotics unit can then take them out of the appropriate preparation compartment 9 and distribute them on the pizza.

As is shown in FIGS. 2 and 3, for example, section 6 can include at least one integrated oven device 4. Alternatively, this is arranged in FIG. 1 behind a partition wall 5 so that the prepared foods must be brought through an opening 12 in box 7 and this partition wall 5 to oven 4. This can also happen by the access of the driver. Partition wall 5 can thus also separate the rear space of the vehicle from driver's position 2 in a sealing manner so that the hygienic conditions are also thereby improved.

Independent of the arrangement of oven device 4, a processing of foods in section 6 can be possible by the driver alone or indirectly via the robotics unit adding various ingredients stored in section 6 to a pizza blank and/or to a noodle base and/or to a hamburger bun or other dough blank. No additional personnel is therefore necessary, but the driver can accomplish this alone. In particular, the pizza blank is placed on a sheet-metal tray that the robot arm, for example a swivel arm, can grasp. Using this robot arm, the blank can be conveyed into oven device 4 as well as further conveyed out of it after heating—for example directly into an existing pizza box. Oven 4, itself, can also constitute a mobile device that is installable in a module of device 3.

Even the forwarding of the blanks assembled in this manner to the loading side 13 of oven device 4, possibly through opening 12, can be possible by the driver and from driver's position 2, for example via a type of tray or the aforementioned sheet-metal tray, which can be moved further and lifted, as necessary. Guides can be installed for this. The finished products can likewise be removed from removal side 14 of oven 4, for example a conveyor oven, possibly through a rear door 15 in a one-man-operation. Packaging in a box can also be done either automatically or by the driver. A complete one-man-operation is thus possible for the processing as well as for the heating, packaging and delivery of the prepared products.

As already indicated, oven device 4 can either be arranged in a section located in the rear of the vehicle and separated from driver's position 2 by a thermally insulated wall 5, or the oven device can be placed in section 6 as in FIG. 5 and FIG. 6, and is then not only essentially extended across the space otherwise provided for a passenger, but reaches far to the rear in the vehicle longitudinal direction.

There is thus sufficient space available for oven device 4 to include a plurality of separate oven compartments 16) beside and/or above each other. In FIG. 5, two oven compartments 16 are indicated over one another; in FIG. 6, two oven compartments 16 are positioned offset with respect to each other. In any case, the simultaneous preparation of a plurality of pizzas, noodle dishes, hamburgers or the like is possible. They can also be delivered at the same time. A plurality of orders can thus be processed in a mobile way simultaneously without calling a base station. In particular, immediately after taking the order, the preparation can be completed to the point that the blanks are slid into the oven so that they can bake during the trip to the customer.

In FIGS. 7 and 8, it is shown in detail how oven device 4 includes a conveyor oven having a loading side 13 and a removal side 14 placed spatially separated from it. Conveyor oven 4 can be arranged longitudinally or transversely or at an angle in the vehicle, depending upon the spatial situation. It can also be possible in this arrangement that pizzas 17, for example, are each pushed through in separate front-beveled frames 18 so that frame 18 when exiting oven 4 can raise additional pizzas 17 in their frames 18, and these then automatically come into a stacked position over each other, from which they can then be packaged.

The driver thus only needs contact with removal side 14, which further improves hygiene. The foods heated in oven device 4 can be removed directly from the outside via a separate vehicle door 15, for example a hatchback or rear door without any special modification. If, for example, a pizza was conveyed internally on a separate sheet-metal plate, this sheet-metal plate can also be removed without contact at the end, for example via working gloves or the like.

The vehicle can thus be an easy-to-park vehicle of a standard compact construction that also requires no outer modification or adaptations.

In addition, an additional cooling device 19 for drinks, desserts, additional ingredients or the like can be provided in the trunk region for rounding out the range of products.

Generally speaking, a stationary kitchen is no longer necessary. The vehicle can drive from its current location directly to the customer without needing to take a detour to a base station.

With the invention, it is for the first time possible to operate such a vehicle truly as a one-man-operation and thus be able to accomplish all the preparation tasks during the drive or during short stops in the trip. The expense and time advantages thus achieved are significant. Using the invention, precooking and a stationary oven can be completely eliminated. It is possible to coordinate a trip in such a manner that the closest route between the individual customers can be sought without having to keep returning to some fixed point in between. In addition to the aforementioned economic advantages, this also means significant ecological relief by avoiding empty trips back to a stationary base.

LIST OF REFERENCE CHARACTERS

1 Vehicle,
2 Driver's position,
2a Steering wheel,
3 Preparation device,
4 Oven device,
5 Partition wall,
6 Section,
7 Boxes,
7a Partition wall,
7b Swiveling flap,
8 Means of access,
9 Storage compartments,
10 Processing surface,
11 Working gloves,
12 Opening,
13 Loading side,
14 Removal side,
15 Rear door(s),
16 Oven compartments,
17 Pizzas,
18 Frames,
19 Cooling device

The invention claimed is:

1. A motor vehicle comprising:
a driver position;
a food assembly surface adjacent to the driver position of the motor vehicle to facilitate assembling food, the food assembly surface arranged in a first section separated from the driver position by at least a first partition wall; and
an oven operable to heat the food, the oven arranged in a second section separated from the driver position by at least a second partition wall,
wherein access to at least the food assembly surface from the driver position is provided without direct human contact with the food.

2. The motor vehicle according to claim 1, wherein the at least first partition wall has at least one opening to allow access to the first section separated from the driver position by the at least first partition wall using at least one glove.

3. The motor vehicle according to claim 2, wherein the at least one glove is sealably installed in the at least one opening and extending into at least the first section.

4. The motor vehicle according to claim 1, wherein the first section is provided with at least one robot operable to assemble foods and controllable from outside the first section separated from the driver position by the at least first partition wall.

5. The motor vehicle according to claim 1, wherein the first section and the second section are formed as a single closed, modular box.

6. The motor vehicle according to claim 1, wherein the first section separated from the driver position by the at least first partition wall includes a spatially separated refrigerator operable to cool stored foods.

7. The motor vehicle according to claim 1, wherein the first section separated from the driver position by the at least first partition wall comprises storage compartments positioned to facilitate application of ingredients to a pizza blank and/or to a noodle base and/or to a hamburger bun or other dough blank directly by the driver or indirectly via a robot.

8. The motor vehicle according to claim 1, wherein the first section separated from the driver position by the at least first partition wall and the second section are positioned to facilitate transferring assembled food from the food assembly surface to the oven by the driver and from the driver position.

9. The motor vehicle according to claim 1, wherein the first section separated from the driver position by the at least first partition wall and the second section are positioned to allow a one-man-operation to facilitate processing, heating, packaging, and delivery of assembled food.

10. The motor vehicle according to claim 1, wherein the second section is located in the rear of the vehicle and the second partition wall includes a thermally insulating wall.

11. The motor vehicle according to claim 1, wherein the oven includes a conveyor having a loading side and a removal side located spatially separated therefrom, the conveyor being operable to facilitate a transfer of blanks to the oven directly by a driver, or indirectly by a robot, from the driver position.

12. The motor vehicle according to claim 1, further comprising a vehicle door, separate from a driver position door, to facilitate removal of foods from the oven from the outside of the vehicle.

13. The motor vehicle according to claim 1, further comprising an additional refrigerator adapted to store at least one of the following: drinks, desserts, and refill ingredients.

14. The motor vehicle according to claim 1, further comprising, a modular packaging unit in the second section.

15. A motor vehicle comprising:
a driver position;
a first section adjacent to the driver position of the motor vehicle, the first section including at least a first partition sealably separating the first section from the driver position;
a food assembly surface arranged within the first section and accessible to assemble food items thereon without direct human contact with the food items;
a second section adjacent the first section, the second section including at least a second partition sealably separating the second section from the driver position; and
at least one appliance operable to heat or cool food, the appliance arranged within the second section.

16. The motor vehicle of claim 15, wherein the at least one first partition includes at least one opening to allow access to the first section separated from the driver position, the vehicle further comprising at least one glove sealably installed in the at least one opening and extending into at least the first section.

17. The motor vehicle of claim 15, wherein the first section and the second section are formed as a single, closed, modular box.

18. The motor vehicle of claim 17, wherein the module box including the first section and the second section includes at least one opening to allow access to the first section or the second section, the vehicle further comprising at least one glove sealably installed in the at least one opening and extending into the modular box.

* * * * *